UNITED STATES PATENT OFFICE 2,286,264

POLYMERIZATION PRODUCT OF ALPHA-CHLOROACRYLIC COMPOUNDS AND PREPARATION OF SAME

John William Croom Crawford, Frodsham, and Nancy McLeish, Runcorn, England, assignors to Imperial Chemical Industries Limited, a corporation of Great Britain No Drawing. Application April 29, 1939, Serial No. 270,900. In Great Britain April 30, 1938

1 Claim. (Cl. 260—84)

This invention relates to plastic compositions and the preparation of same, and more particularly, to molding compositions comprising polymeric methyl-alpha-chloroacrylate.

Alpha-chloroacrylic acid and its derivatives such as its esters, amides, or anhydrides, have been known heretofore. The preparation of the acid by reacting formaldehyde with trichloroethylene in the presence of sulphuric acid and subsequently heating the resulting mixture in the presence of water, as well as the preparation of various esters and derivatives from the acid is disclosed in United States patent application Serial No. 235,900, filed October 19, 1938, jointly in the name of the present applicants and another and entitled "Manufacture of acids and derivatives thereof."

The use of polymeric alpha-chloroacrylic compounds in plastics has not been proposed heretofore nor is there recognition in the prior art of interpolymers comprising as the major component thereof, or even as a substantial component thereof, an alpha-chloroacrylic compound.

In the specification and claims the term "polymerization" is used in a generic sense to cover the polymerization of a single monomeric polymerizable compound or the simultaneous polymerization of two or more different monomeric polymerizable substances. The term "polymer" is inclusive of both the product formed from the polymerization of a single monomeric compound or the product obtained by the simultaneous polymerization of two or more different monomeric polymerizable substances.

An object of the present invention is to provide valuable new molding compositions and means for preparing same. A further object is to provide new interpolymers adapted for use in the plastics field. A still further object is to provide new molding compositions which are relatively non-inflammable. Other objects will be apparent from the description of the invention given hereinafter.

The above objects are accomplished according to the present invention by the use in plastic compositions of methyl-alpha-chloroacrylates and a polymerizable vinyl or vinylidene compound of the formula

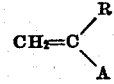

in which R is either hydrogen, alkyl or halogen and A is halogen or acyloxy.

It has been discovered that polymeric alpha-chloroacrylic compounds, particularly methyl alpha-chloroacrylate, are well adapted for use in the plastics field, their use as molding compositions being of great interest. These polymers not only possess good molding properties, toughness, strength, and other requisite properties for an acceptable plastic, all of which properties vary to a considerable degree depending upon the particular compounds under consideration and the quantity and kind of plasticizer and other modifying agent, if any, used, but also are characterized by a high degree of non-flammability.

Also, valuable new compositions, especially adapted for use in the plastics field, may be obtained by subjecting to polymerizing conditions a mixture of monomeric methyl-alpha-chloro-acrylate and a substituted vinyl or vinylidene compound.

In preparing plastic compositions comprising a polymeric methyl-alpha-chloroacrylate and a plasticizer, or filler, or both, the latter components may be incorporated with the polymerizable component before or after the polymerization takes place, or after a partial polymerization which converts it to a plastic or viscous condition, the polymerization being subsequently completed. The polymerization may be brought about under the influence of light and/or heat and, preferably, in the presence of oxygen yielding substances, e. g., a peroxide catalyst such as benzoyl peroxide or a peroxide of a dicarboxylic acid, such as succinyl peroxide, dilauroyl peroxide, dibutyryl peroxide, acetyl benzoyl peroxide, etc. Sulfur dioxide and sulfur dioxide yielding substances may also be used.

One method of carrying out the polymerization is in the presence of a solvent, e. g., chloroform or methylene dichloride, which dissolves both the monomers and the polymer, or liquids such as trichlorethylene or petroleum spirit which are solvents for the monomer but not for the polymer, in which case the latter separates out as the reaction proceeds and can be removed, e. g., by decantation. The unpolymerized material may also be emulsified in a non-solvent liquid, particularly in the presence of emulsifying agents, with or without additional stabilizing agents, and polymerization then brought about by heating in the presence of a peroxide catalyst dissolved in either phase. Suitable emulsifying agents are the water-soluble long chain sulfates or sulfonates, e. g., cetyl hydrogen sulfate or sulfonated castor oil soaps.

Yet another method of carrying out the polymerization is to agitate the unpolymerized material with a solution of a high molecular weight colloid in a liquid which is a non-solvent both for the monomeric material and the polymerized product, whereby the former is broken up into small spheres or granules (which are, however, larger than emulsion particles) and the polymerization then performed by heating with a peroxide catalyst dissolved in either phase.

The following examples, in which parts are stated by weight, illustrate specific embodiments of the invention:

*Example I.*—4.5 parts of methyl alpha-chloroacrylate (B.P.34.5° C./22 mm.) were mixed with 0.5 part of camphor and 0.05 part of dry recrystallized benzoyl peroxide. The latter dissolved readily at room temperature.

The monomer was then polymerized by heating in a glass vessel at 80° C. After a short period the liquid became viscous and after a further few minutes polymerization proceeded vigorously with some refluxing of unpolymerized ester. The reaction was completed by heating at 100° C. for a further half hour. The product was a colorless transparent thermoplastic polymer which could be molded at 100° C. Small pieces when ignited, ceased to burn immediately upon withdrawal from the source of heat.

Similar products were obtained using in place of the camphor of the above example dibenzyl ether, dibutyl phthalate, dibutyl tartrate, benzyl benzoate and tricresyl phosphate, respectively. The products were slightly colored where the plasticizer was colored and, in the case where dibutyl phthalate and dibutyl tartrate were used, the product continued to burn for a few seconds after removal from the flame.

*Example II.*—4.00 parts of distilled water and 8 parts of soluble starch were mixed and heated at 90° C. in an apparatus provided with a thermometer, an efficient mechanical stirrer, and a reflux condenser. A solution of 2 parts of dry benzoyl peroxide and 5 parts of tricresyl phosphate in 200 parts of methyl alpha-chloroacrylate monomer were added to the hot stirred solution of starch. Polymerization occurred after about 15 minutes; the disappearance of monomer was detected by the boiling point of the mixture approaching 100° C. When polymerization was complete, the reaction mixture was filtered to separate granular polymer. The latter was washed with distilled water on the filter, and boiled for 30 minutes with distilled water to desorb the starch, filtered, washed again with distilled water and dried out in a vacuum oven at 60° C. under a pressure of 20 millimetres.

*Example III.*—400 parts of distilled water and 4 parts of soluble starch were heated to 90° C. in an apparatus similar to that described in Example II. 80 parts of a previously prepared solution of 1 part of dry benzoyl peroxide in a mixture of 180 parts of methyl alpha-chloroacrylate and 20 parts of tricresyl phosphate were added to the stirred starch solution. Polymerization was observed to occur after 5 minutes. The rest of the ester was then added in portions. To complete the polymerization the mixture was heated for 15 minutes after the boiling point had risen to 100° C. The granular polymer was separated and purified as described in Example II.

*Example IV.*—A solution of 1 part of dry benzoyl peroxide in 100 parts of methyl alpha-chloroacrylate was added to a well-stirred solution of 5 parts sodium isopropyl-naphthalene sulphonate and 10 parts soluble starch in 500 parts water at 80° C. The temperature was raised to 95° C. and maintained at that value for about half an hour. After cooling the emulsion was acidified with hydrochloric acid and shaken, whereupon the polymer was precipitated. The latter was washed and compounded with barium sulphate and titanium oxide on hot rolls into a molding composition.

*Example V.*—Forty parts of methyl alpha-chloroacrylate containing 0.2 part of benzoyl peroxide were polymerized using a solution of 0.2 part of methyl starch in 100 parts of water as the dispersing medium. Polymerization was complete within 15 minutes as judged by the cessation of reflux. The product was washed until the washings were clear, and the product dried at about 60° C. The yield of polymer was 35 parts. A molded chip of the polymer was hard and softened at about 135° C., when immersed in a heated oil bath.

*Example VI.*—Twenty-five parts of methyl alpha-chloroacrylate monomer were heated at 50° C. under a pressure of about 350 mm. in a vessel equipped with a closed reflux condenser. At the end of four days the material was completely polymerized to a clear, hard mass. A molded chip prepared from this material softened at about 132° C., when immersed in a heated oil bath.

*Example VII.*—Mixtures of various proportions of methyl alpha-chloroacrylate and vinyl acetate, totaling 100 parts and containing 0.5 part of benzoyl peroxide, were gradually heated in water-jacketed vessels until polymerization was observed to commence. On completion of the exothermic reaction solid polymers were obtained.

Polymers from mixtures containing less than 30% of vinyl acetate, prepared according to the above procedure, were clear and transparent. Above this and up to 80% vinyl acetate they were opalescent or semi-opaque. Molded material made from 10% vinyl acetate interpolymer softened at 72° C. from the 80% vinyl acetate interpolymer, at 30% C.

*Example VIII.*—A mixture of 80 parts of methyl alpha-chloroacrylate and 20 parts vinyl acetate polymerized as described in Example VII was molded in a compression mold. A similar polymer from 90 parts of methyl alpha-chloroacrylate and 10 parts of vinyl acetate which did not char below 140° C. but began to soften at 72° C. was molded satisfactorily at 120 C.

*Example IX.*—A mixture of 30 parts of methyl alpha-chloroacetate and 10 parts of vinyl chloroacetate containing 0.2 part of benzoyl peroxide, was heated in a closed container at 50° C. for 24 hours. The mixture was converted to a clear, hard mass which could be shaped by filing, sawing, drilling, turning, et cetera.

It will be understood that the above examples are merely illustrative and that the invention broadly comprises the use of interpolymers of a methyl-alpha-chloroacrylate and a polymerizable vinyl or vinylidene compound as new compositions.

In preparing molding compositions, plasticizers for the polymers are generally used to advantage. The proportion of plasticizer may be varied widely but the plasticizer is usually employed in a proportion of 2½ to 50 parts, by weight, per 100 parts of polymer although a higher proportion of plasticizer may be used in specific instances where the plasticizer is compatible with the polymer in such high proportions. Suitable plasticizers include: camphor, dibutyl phthalate, dibutyl tartrate, tricresyl phosphate, tributyl citrate, dibenzyl ether, benzyl benzoate, butyl adipate, coumarone, and glyceryl triacetate.

Suitable fillers which may be incorporated with the polymers and interpolymers herein considered include: barytes, talcum powder, mica, iron oxide, powdered slate, and asbestos.

In addition to plasticizers and fillers there may be added to the polymers pigments such as aniline black, carbon black, titanium dioxide, cadmium selenide, chromium trioxide, Prussian blue, and ocher. Transparent colored products may be obtained by dissolving in the monomers a soluble dyestuff.

As those skilled in the art will understand, other modifying agents, and the like, may be employed with these polymers in the manufacture of molding compositions, and the use of a small proportion of mold lubricant such as stearic acid, is of some advantage. Likewise, the various effect materials such as pearl essence, bronze powders, and the like, may be added.

The production of articles from molding compositions prepared according to the present invention, can be achieved by the use of compression molding and injection molding processes used for thermoplastic resins, the temperatures employed varying according to the particular composition chosen. Thus, for methyl alpha-chloroacrylate polymer, molding may be carried out at temperatures of about 130° C. but below 140° C., at which temperature there is some danger of charring. With interpolymers of methyl alpha chloroacrylate and vinyl acetate, on the other hand, a lower temperature range is preferable, e. g., in the case of an interpolymer from 80% methyl alpha-chloroacrylate and 20% vinyl acetate, a suitable molding temperature is 100° C. and 120° C. should not be exceeded due to the danger of charring.

The molding compositions of the present invention can also be employed as thermo setting resins by carrying polymerization far enough to produce a plastic material, and then completing the polymerization by heat after shaping the article.

The molding compositions here considered are suitable for use in the manufacture of such rigid articles as trays, umbrella handles, paper weights, book ends, telephone receivers, hollow vessels such as ink wells, cups, beakers, and boxes.

An advantage of the present invention is that it has provided a new group of plastic substances well adapted for various uses in the plastics field, especially for injection and compression molding where the plastic is used in comminuted form. A further advantage is that the invention provides a group of materials which, through suitable selection and proportion, can be formed into plastics having widely varying properties and yet which are all characteristically relatively noninflammable. In addition, the compositions here considered are relatively easy to manufacture in accordance with established practices and are economical both with respect to the starting materials employed and the cost of manufacture.

As many apparently widely different embodiments of this invention may be made without departing from the spirit and scope thereof, it is to be understood that the invention is not limited to the specific embodiments thereof except as defined in the appended claim.

We claim:

A clear and transparent plastic composition comprising an interpolymer of methyl-alpha-chloroacrylate with vinyl acetate, said interpolymer containing from 10 to 30% of vinyl acetate.

JOHN WILLIAM CROOM CRAWFORD.
NANCY McLEISH.

CERTIFICATE OF CORRECTION.

Patent No. 2,286,264. June 16, 1942.

JOHN WILLIAM CROOM CRAWFORD, ET AL.

It is hereby certified that error appears in the printed specification of the above numbered patent requiring correction as follows: Page 1, first column, line 15, for the word "applicants" read --applicant--; page 2, first column, line 38, for "4.00" read --400--; and second column, line 46, for "30% C." read --30° C.--; line 53, for "120 C." read --120° C.--; page 3, first column, line 7, strike out "and interpolymers"; and that the said Letters Patent should be read with this correction therein that the same may conform to the record of the case in the Patent Office.

Signed and sealed this 4th day of August, A. D. 1942.

(Seal)

Henry Van Arsdale,
Acting Commissioner of Patents.